(12) United States Patent
Byes

(10) Patent No.: US 11,737,442 B2
(45) Date of Patent: Aug. 29, 2023

(54) TACKLE BOX HAVING AN ITEM RETENTION FEATURE

(71) Applicant: Ronald Byes, Lodi, CA (US)

(72) Inventor: Ronald Byes, Lodi, CA (US)

( * ) Notice: Subject to any disclaimer, the term of this patent is extended or adjusted under 35 U.S.C. 154(b) by 29 days.

(21) Appl. No.: 17/580,788

(22) Filed: Jan. 21, 2022

(65) Prior Publication Data

US 2023/0009471 A1    Jan. 12, 2023

Related U.S. Application Data

(60) Provisional application No. 63/219,936, filed on Jul. 9, 2021.

(51) Int. Cl.
*A01K 97/06*    (2006.01)

(52) U.S. Cl.
CPC .................... *A01K 97/06* (2013.01)

(58) Field of Classification Search
CPC ...................................................... A01K 97/06
USPC .................................................... 206/315.11
See application file for complete search history.

(56) References Cited

U.S. PATENT DOCUMENTS

| 4,691,470 A | * | 9/1987 | Landell | ................. | A01K 97/06 |
| | | | | | 43/17.5 |
| 2019/0000058 A1 | * | 1/2019 | Murar | ................. | A01K 97/06 |
| 2023/0070991 A1 | * | 3/2023 | Makos | ................. | A01K 97/01 |

* cited by examiner

*Primary Examiner* — Jacob K Ackun

(74) *Attorney, Agent, or Firm* — Brennan, Manna & Diamond, LLC

(57) ABSTRACT

The present invention relates generally to the field of an accessory container such as a tackle box or container for holding craft supplies. The container has a geometrically-shaped body or housing that has a top surface forming a lid, two pairs of generally parallel sidewalls and a bottom surface. The bottom surface of the lid and an interior surface have a retention element which include a spring-loaded plunger, at least one peg, and at least one spool. The hook of a fishing lure is first attached to a peg. Then, the fishing line is wrapped around the at least one spool. Next, the line can be attached to the tension loading device. As a result, the lure or item and the line are placed under constant tension, such that they cannot move while in the container.

20 Claims, 3 Drawing Sheets

TACKLE BOX HAVING AN ITEM RETENTION FEATURE

CROSS-REFERENCE TO RELATED APPLICATION

The present application claims priority to, and the benefit of, U.S. Provisional Application No. 63/219,936, which was filed on Jul. 9, 2021, and is incorporated herein by reference in its entirety.

FIELD OF THE INVENTION

The present invention relates generally to the field of sporting accessories or other containers having an item retention feature. More specifically, the present invention relates to a tackle box or enclosure having a preferably rectangular body with a top surface having a lid, two pairs of generally parallel sidewalls and a bottom surface. The bottom surface of the lid and an interior surface further include at least one tension loading device, at least one peg and at least one spool. A fishing lure can be attached to a peg, then a fishing line of the lure can be wrapped around at least one spool. Next, the fishing lure, flasher, dodger, or bobber can be attached to the hook on the tension loading device by pulling or pushing down on the tension loaded device. As a result, the lure and line are placed under constant tension, such that they cannot move while contained within the tackle box. Therefore, multiple lures can be stored in a separated and immovable manner such that the user of the tackle box does not have to untangle the lures from one another. Accordingly, the present disclosure makes specific reference thereto. Nonetheless, it is to be appreciated that aspects of the present invention are also equally applicable to other like applications, devices and methods of manufacture.

BACKGROUND

Many individuals enjoy fishing for sport or for hobby. While fishing, fishermen typically employ natural fishing bait such as worms or smaller baitfish. However, specific fish may be more attracted to artificial bait lures. Such artificial bait lures typically have elaborate bodies that may have a plurality of moving and long components which can become tangled when stored in the tackle box. As a result, the lures may become damaged within a tackle box. In addition, lures may be piled atop one another in existing tackle boxes, such that a user cannot quickly and easily locate a specific lure within the tackle box due to the jumbled mess. Further, existing tackle boxes known in the art have no means to ensure that individual lures do not move within the box during transport or other handling of the box.

Therefore, there exists a long-felt need in the art for an improved tackle box. There also exists a long-felt need in the art for a tackle box device that ensures that fishing lures do not become entangled or damaged while being stored within the box. Further, there exists a long-felt need in the art for a tackle box that allows a specific lure to be quickly identified as it is stored within the box. Finally, there exists a long-felt need in the art for a tackle box device that ensures that lures do not move or shift during transport of the box.

The subject matter disclosed and claimed herein, in one embodiment thereof, comprises a tackle box for holding and transporting various lures and other fishing equipment. The device has a rectangular or square body with a top surface that provides an opening, two pairs of generally parallel sidewalls and a bottom surface. The bottom surface of the lid and an interior surface of the body further include at least one spring-loaded tension device, at least one slanted, angled, or straight peg, and at least one spool. A fishing lure first can be attached to a peg. Then, the fishing line of the lure can be wrapped around the at least one spool. Next, the fishing lure, flasher, dodger, or bobber can be attached to the hook on the tension-loading device by pulling or pushing down on the tension loading device. As a result, the lure and line are placed under constant tension, such that the lure or other fishing equipment or tackle cannot move while in the tackle box. Therefore, multiple lures and other tackle can be stored in a separated, generally immovable and organized fashion.

In this manner, the tackle box device of the present invention accomplishes all of the forgoing objectives and provides an improved tackle box. The device further ensures that fishing lures do not become entangled while being stored within the device. In addition, the device allows a specific lure to be quickly identified as it is stored within the box. Finally, the tackle box device ensures that the lures do not move during transport of the box.

SUMMARY OF THE INVENTION

The following presents a simplified summary in order to provide a basic understanding of some aspects of the disclosed innovation. This summary is not an extensive overview, and it is not intended to identify key or critical elements or to delineate the scope thereof. Its sole purpose is to present some general concepts in a simplified form as a prelude to the more detailed description that is presented later.

The subject matter disclosed and claimed herein, in one embodiment thereof, is a tackle box having a retention feature. The tackle box is includes a rectangular, square or other quadrate body that has a top surface which includes a lid, two pairs of generally parallel sidewalls and a bottom surface. The shape of the box may be of any geometric or fanciful shape. The lid is further attached to one sidewall with at least one hinge. In addition, the lid and/or sidewalls may have at least one lock that allows the body to be locked and secured.

The interior surface and/or the bottom surface of the lid have at least one plunger and at least one peg that may be slanted, angled or straight, so that the plunger and the plurality of pegs may be arranged in any row, column or random arrangement of any desired spacing or orientation within the interior space and bottom surface. The plunger has a protective housing that protects a spring which encloses a hook or grasping element. In this manner, the plunger has a spring-loaded action (e.g., when tension is applied to the hook or grasping element, tension is applied to the spring and the hook travels outward from the housing). Optional tension devices such as a bungee cord with at least one J-hooks or S-hooks or a rubber band with at least one S hook may also be used in place of the plunger. In this manner, the cord or rubber band attaches to the peg and thereby takes the place of the plunger.

Using the tension loading device, spool, and the peg, the tackle box can be used to store at least one fishing lure or other fishing tackle. A user first attaches the hook of a lure to a peg. Then, the fishing lure is wrapped around the at least one spool. Next, the fishing lure, flasher, dodger, or bobber is pulled towards the tension loading device and is attached to the hook of the device. As a result, the spool and plunger maintain constant tension on the line, such that the lure cannot move within the body.

Accordingly, the tackle box of the present invention is particularly advantageous as it provides an improved tackle box that ensures that fishing lures and other fishing tackle do not become entangled while being stored within the container. Further, the tackle device allows a specific lure or other tackle to be quickly identified as it is stored in an organized and secure manner within the tackle box. Finally, the tackle box ensures that lures and other tackle do not move during transport or other handling of the tackle box.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

Figure 1:
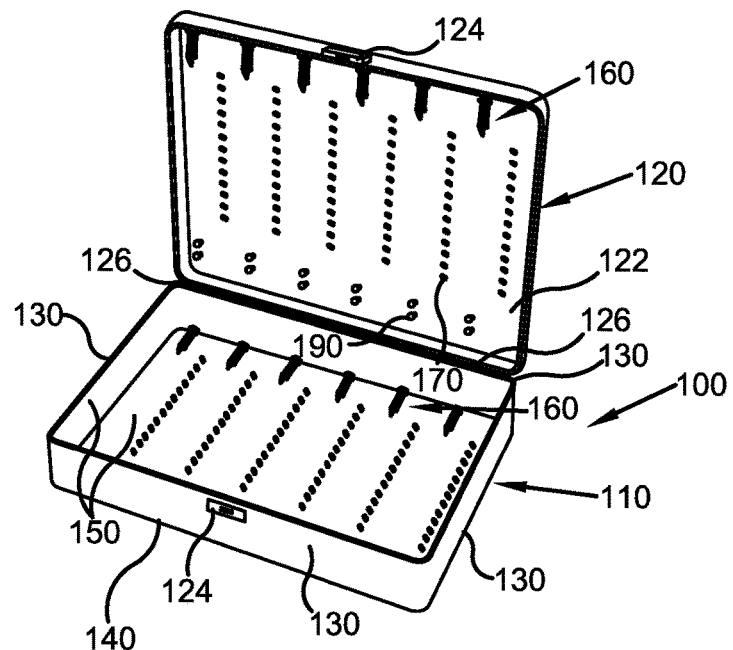
FIG. 1 illustrates a perspective view of one potential embodiment of a tackle box having a retention feature of the present invention in an opened position while empty in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention, and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved tackle box. There also exists a long-felt need in the art for a tackle box device that ensures that fishing lures or other tackle does not become entangled while being stored within the tackle box. Further, there exists a long-felt need in the art for a tackle box that allows a specific lure to be quickly identified as it is stored within the box. Finally, there exists a long-felt need in the art for a tackle box that ensures that lures and other tackle do not move or become tangled during transport or handling of the box.

The present invention, in one exemplary embodiment, is comprised of an enclosure for holding tackle for fishing or other hobbyist-related activities such as a box or other container for making crafts where it is important to hold the craft components so that they do not become tangled. The invention is a preferably geometric configuration such as a rectangular, squire or quadrate shaped body. The body may have any sort of shape including fanciful designs. The body of the container includes a top surface which forms of a lid or closure for the container or enclosure, two pairs of generally parallel sidewalls, and a bottom surface. The lid is further attached to one sidewall via at least one hinge or other pivoting configuration. Further, the lid and/or sidewalls may have at least one lock or other closure mechanism that allows the body to be locked and secured. The interior surface and/or the bottom surface of the lid also include at least one plunger, at least one spool, and at least one peg. The plunger provides a reciprocating motion to allow an item to be hooked to one end of the retention features wherein the retention feature holds the item in a closed position, or wrapped around a spool and attached to a peg and then the spring holds the retention feature in a closed position. The plunger moves from a first position which is closed and retains the item in a locked position and to a second position where the item can be attached to the plunger. The peg may be slanted, angled or straight when inserted into the base, bottom or side walls of the enclosure. The tension loading device and the plurality of pegs may be arranged in any number of rows, columns or a random arrangement or may be configured to accommodate a specific type of tackle or craft supply or any other desired spacing or orientation within the interior space and bottom surface. The pegs are provided in a spaced arrangement to accommodate different sized items so that the user is able to accommodate variable sized items within the container. In addition, the unused pegs when positioning the initial item may be used for holding another item within the container so as to maximize the utility of the enclosure. The plunger also has a protective housing that protects a spring which encloses a hook. Accordingly, the plunger has a spring-loaded action (e.g., when tension is applied to the hook, tension is then applied to the spring and the hook travels outward from the housing).

Using the tension loading device, spool, and the peg, the tackle box can be used to store at least one fishing lure or other fishing tackle. A user first attaches the hook of a lure to a peg. Then, the fishing line of the lure is wrapped around the at least one spool. Next, the fishing lure, flasher, dodger, robber, etc. is pulled towards the tension loading device and is attached to the hook of the device. As a result, the spool and plunger maintain constant tension on the line, such that the lure cannot move within the body.

Accordingly, the tackle box, craft container or enclosure of the present invention is particularly advantageous as it provides an improved tackle box or enclosure that ensures that the fishing lures do not become entangled while being stored within the device. Further, the device allows a specific lure to be quickly identified as it is stored within the box. Finally, the arrangement of the tackle box ensures that lures or other items held within the box or enclosure do not move or shift during transport or handling of the box.

Referring initially to the drawings, FIG. 1 illustrates a perspective view of one potential embodiment of a tackle box or enclosure 100 of the present invention in an opened position while empty in accordance with the disclosed specification. The device 100, which may be also be known as the byes k tackle box having a retention feature 100, has a shell or body 110 that has a top surface, which forms a closure or lid 120 for the box 100. Two pairs of generally parallel sidewalls 130, with one pair having a shorter width than the other pair, create a first pair of short side walls and a pair of longer side walls. The box 100 further includes a bottom surface 140 which is joined to an end edge of each of the wall. In differing embodiments, the lid 120, sidewalls 130 and bottom surface 140 may be manufactured from a durable metal such as, but not limited to, stainless steel, aluminum or other metals or alloys, or a plastic such as, without limitation, acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass and various combinations of the foregoing. The body 110 in the currently described embodiment is shown in a rectangular configuration, but it should be understood that the shape of the body may also be square, circular, oblong, triangular, trapezoidal, octagonal or other fanciful configuration in differing embodiments. The body 110 may also be transparent, semi-transparent or opaque. In addition, the body 110 may be dimensioned to accommodate any number of lures or other craft items 10 and other supplies as may be needed by the user in sporting, crafting or any other activity.

The lid 120 is further attached to at least one sidewall 130 via at least one hinge 126. In alternate embodiments, the lid may operate as a two-part closure lid in which each half of the closure or lid is attached to different sidewalls. In differing embodiments of the device 100, the hinge 126 may be any hinge type known in the art such as, but not limited to, an offset blind hinge, a knuckle hinge, a butt hinge, a rising butt hinge, a gravity pivot hinge, a ball bearing hinge, a barrel hinge, a concealed hinge, a knife hinge, a piano hinge, a strap hinge, a pivot hinge, a gas-piston hinge, an injection molded hinge, a locking hinge, etc. In addition, in order to secure the closure or lid 120 to the rest of the body 110, the closure or lid 124 and/or sidewalls 130 may have at least one lock 124. In differing embodiments, the lock 124 may be any lock type known in the art such as, but not limited to, a padlock, a deadbolt lock, a cam lock, a rim/mortise lock, a euro profile cylinder lock, an interchangeable core cylinder lock, a furniture latch lock, a rim latch lock, a biometric fingerprint scanning lock, an RFID key fob lock, a Bluetooth lock that unlocks via a smart device mobile application, a mechanical dial lock, a numerical combination lock, a pedestal lock, a draw lock, a fixed core lock, etc.

Figure 2:
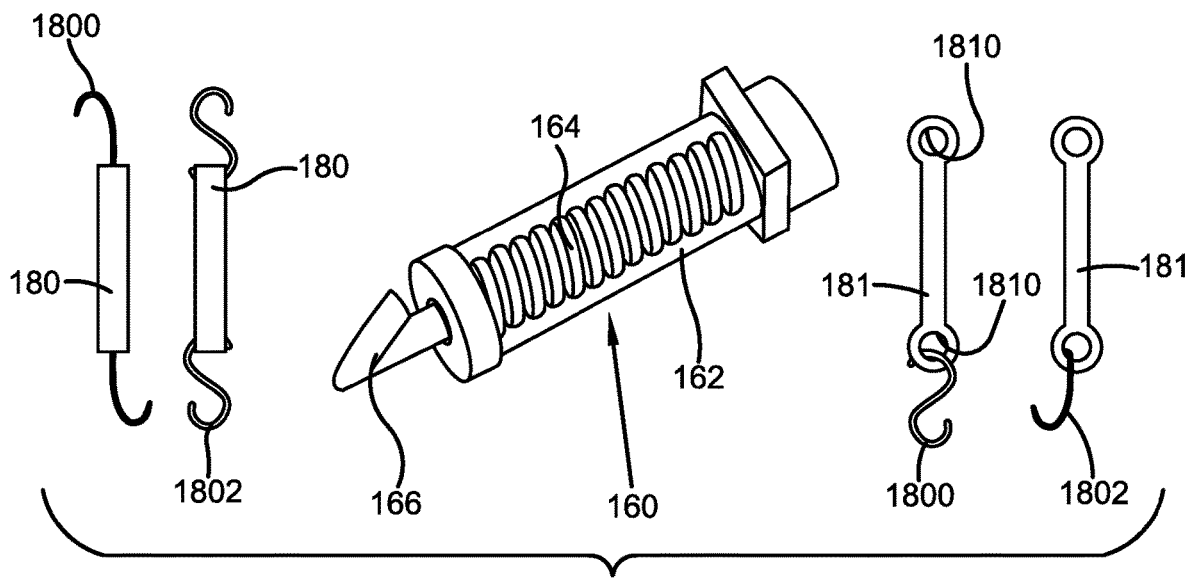
FIG. 2 illustrates an enhanced perspective view of one potential embodiment of a plunger of the tackle box having a retention feature of the present invention in accordance with the disclosed architecture.

The interior surface 150 and/or the bottom surface 122 of the lid 120 includes at least one retention device such as but limited to at least one plunger 160, at least one bungee cord 180, and/or at least snubber one rubber band 181 (as seen in FIG. 2), and at least one peg 170 that may be slanted, angled or straight. The plunger 160 and the peg or pegs 170 may be arranged in any row, column or random arrangement of any desired spacing or orientation within the interior space 150 and bottom surface 122. Further, the plunger 160, cord 180, and/or rubber band 181 may be fixedly or removably attached to any surface of the box 100. As best seen in FIG. 2, the plunger 160 has a protective housing 162 that may be made of a durable metal, glass or plastic material listed supra. The plunger provides a reciprocating motion to allow an item to be hooked to one end of the retention feature, and then the spring holds the retention feature in a closed position. Within the housing 162, a spring 164 surrounds a shaft of a hook 166, such that the plunger 160 has a spring-loaded action (e.g., when tension is applied to the hook 166, tension is applied to the spring 164 and the hook 166 travels outward from the housing 162. The bungee cord 180 is preferably manufactured from an elastic material and has at least two hooks. In one embodiment, the cord 180 has at least two S-shaped hooks 1800. In another embodiment, the cord 180 has at least two J-shaped hooks 1802. An embodiment with at least one rubber band member 181 further has at least two continuous opening 1810 wherein one opening 1810 can receive either or both types of hooks 1800, 1802 and the other opening 1810 can be attached around a peg 170.

Figure 3:
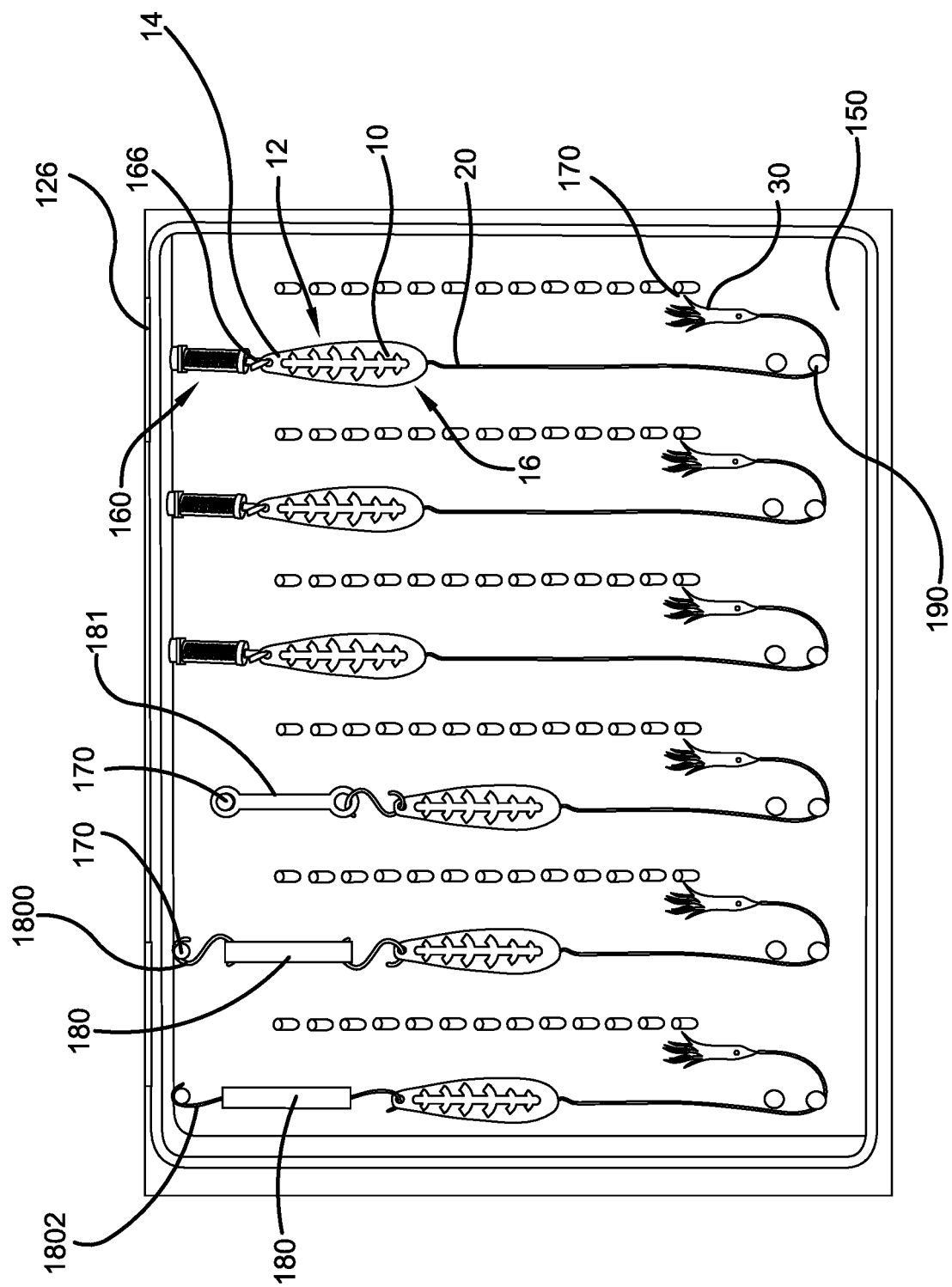
FIG. 3 provides a top perspective view of one potential embodiment of the tackle box having a retention feature of the present invention in an opened position and being used to store a plurality of fishing lures or other tackle in accordance with the disclosed architecture.

FIG. 3 illustrates a top perspective view of one potential embodiment of a tackle box or other enclosure 100 of the present invention in an opened position while storing a plurality of fishing lures or other items 10 in accordance with the disclosed specification. The device 100 can be used to store at least one fishing lure or other item 10, wherein the item 10 is any type known in the art, that may or may not also include accessory items such as beads, hooks, bobbers or other items that may be used with the items being stored. To store a lure 10, a user first attaches the hook 30 of a line 20 around the peg 170. Then, any line, string, chain or the like 20 can be pulled away from the hook 30 and wrapped around at least one spool 190, such that the line, string or chain 20 is wrapped around the spool 190 and held in position around the spool 190 which prevents the line 20, string or chain from unwinding. Then, the remaining portion of the line 20 and the lure 10 can be attached to the hook 166 of the plunger 160 or the hooks 1800,1802 of the bungee cord 180 or rubber band 181 by inserting the hook 166, 1800,1802 through a continuous opening 14 of the top end 12 of the lure 10 (or through the body of an item 10 in an item 10 that does not have a continuous opening). In this manner, the hook 30, spool 190, and plunger/bungee cord/ rubber band 160,180,181 maintain constant tension on the line 20 such that the lure 10 cannot move within the body or housing 110.

Figure 4:
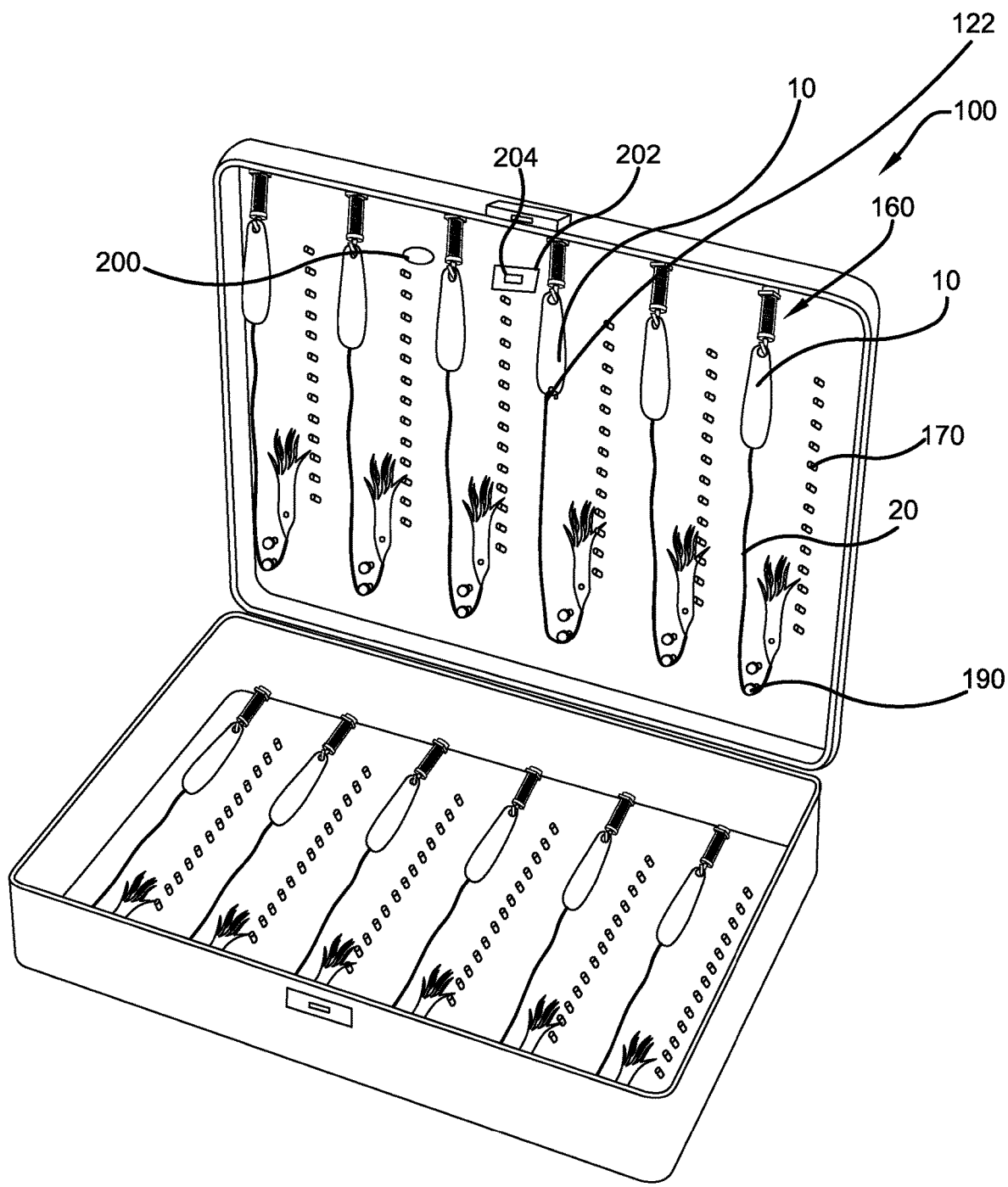
FIG. 4 illustrates a perspective view of one potential embodiment of the tackle box having a retention feature of the present invention in an opened position while storing a plurality of fishing lures in accordance with the disclosed architecture.

In one embodiment of the device 100, the hook 166,1800, 1802 and peg or pegs 170 may be manufactured from a magnetic metal material. It should be also appreciated that in any embodiment, the plunger 160, bungee cord 180, rubber hand 181, peg 170, and spool 190 as described supra may be present on the interior surface 150 and the bottom surface 122 of the lid 120, as seen in FIG. 4. The plunger 160, bungee cord 180, rubber hand 181, peg 170 and spool 190 may further be fixedly-attached to the interior surface 150 and/or bottom surface 122. The plunger 160, peg 170, and spool 190 may also be removable from the bottom surface 122, such that they can be reconfigured based on the desires of the user. In a removable embodiment, the interior surface 150 is preferably magnetic.

The bottom surface 140 of the lid 120 and/or the interior surface 150 may further include at least one LED 200 that is motion-activated such that the LED 200 illuminates whenever the lid 120 is opened, and ceases to illuminate when the lid 120 is closed. Therefore, the LED 200 illuminates any lures 10 within the body 110. The at least one LED 200 is further powered by an internal battery 202. The battery 202 may be a disposable battery or a rechargeable battery in the form of an alkaline, nickel-cadmium, nickel-metal hydride battery, etc., such as any 3V-12 volts DC battery or other conventional battery such as A, AA, AAA, etc. that supply power to the device 100. Throughout this specification, the term "battery" may be used interchangeably to refer to one or more wet or dry cells or batteries of cells in which chemical energy is converted into electricity and used as a source of DC power. References to recharging or replacing the battery 202 may refer to recharging or replacing individual cells, individual batteries of cells or a package of multiple battery cells, as is appropriate for any given battery technology that may be used. In addition, a rechargeable embodiment of the battery 202 may be recharged using a USB port 204, wherein the USB port 204 is a USB-A, USB-B, Micro-B, Micro-USB, Mini-USB or USB-C port.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "tackle box device" "device" "byes k tackle box having a retention feature" and "box" are interchangeable and refer to the tackle box device 100 of the present invention.

Notwithstanding the forgoing, the tackle box device 100 of the present invention and its various components can be of any suitable size and configuration as is known in the art without affecting the overall concept of the invention, provided that they accomplish the above-stated objectives. One of ordinary skill in the art will appreciate that the size, configuration and material of the tackle box device 100 as shown in the FIGS. are for illustrative purposes only, and that many other sizes and shapes of the tackle box device 100 are well within the scope of the present disclosure. Although the dimensions of the tackle box device 100 are important design parameters for user convenience, the tackle box device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A tackle box device that can be used to immovably store a plurality of fishing lures, the tackle box device comprising:
    a body further comprised of a lid, a first pair of parallel sidewalls, a second pair of parallel sidewalls, a bottom surface, and an interior surface;
    at least one hinge;
    at least one lock;
    at least one spring-loaded plunger;
    at least one bungee cord with an at least two hooks;
    at least one rubber band with an at least two continuous openings;
    at least one peg located on the interior surface;
    at least one spool;
    at least one LED; and
    a battery.

2. The tackle box device of claim 1, wherein the plurality of fishing lures can be stored within the interior surface and/or a bottom surface of the lid.

3. The tackle box device of claim 2, wherein the plurality of fishing lures are attached to the at least one-spring loaded plunger, the at least one bungee cord, or the at least one rubber band.

4. The tackle box device of claim 1, wherein to secure a fishing lure within the tackle box device, a user attaches a hook of a fishing lure around the at least one peg, then wrapping a fishing line of the fishing lure around the at least one spool, then attaches a hook of the at least one spring-loaded plunger, the at least one bungee cord, or the at least one rubber band to the fishing lure.

5. The tackle box device of claim 1, wherein the fishing lure is stored in constant tension such that it is immovable.

6. A tackle box device that can be used to immovably store a plurality of fishing lures, the tackle box device comprising:
    a body further comprised of a lid, a first pair of parallel sidewalls, a second pair of parallel sidewalls, a bottom surface, and an interior surface;
    at least one hinge that attaches to the lid and to one sidewall of the first pair or the second pair of parallel sidewalls;
    at least one lock that allows the body to lock;
    at least one spring-loaded plunger further comprised of a hook that receives an at least one fishing lure;
    at least one bungee cord with an at least two hooks;
    at least one rubber band with an at least two continuous openings;
    at least one peg that receives a hook of the at least one fishing lure and/or the at least one spring-loaded plunger, the at least one bungee cord, and/or the at least one rubber band;
    at least one spool that receives a fishing line of the at least one fishing lure;
    at least one LED that is motion activated when the lid opens or closes; and
    a battery that powers the at least one LED.

7. The tackle box device of claim 6, wherein the plurality of fishing lures can be stored within the interior surface and/or a bottom surface of the lid.

8. The tackle box device of claim 7, wherein the plurality of fishing lures are attached to the at least one-spring loaded plunger, the at least one bungee cord, or the at least one rubber band.

9. The tackle box device of claim 8, wherein the at least one spring-loaded plunger, the at least one rubber band, or the at least one bungee cord are fixedly or removably attached to the interior surface of the tackle box device.

10. The tackle box device of claim 7, wherein the at least one spool is used for winding a string, a line or a chain of each of the plurality of fishing lures.

11. The tackle box device of claim 7, wherein a hook of each of the plurality of fishing lures can be secured around the at least one peg.

12. The tackle box device of claim 7, wherein the at least two hooks of the at least one bungee cord are S-shaped and/or J-shaped and receive the at least one fishing lure.

13. The tackle box device of claim 6, wherein to secure a fishing lure within the tackle box device, a user attaches a hook of a fishing lure around the at least one peg, then wrapping a fishing line of the fishing lure around the at least one spool, then attaches a hook of the at least one spring-loaded plunger, the at least one bungee cord, or the at least one rubber band to the fishing lure.

14. The tackle box device of claim 13, wherein the fishing lure is stored in constant tension such that it is immovable.

15. A tackle box device that can be used to immovably store a plurality of fishing lures within the tackle box device, the tackle box device comprising:
 a body further comprised of a lid, a first pair of parallel sidewalls, a second pair of parallel sidewalls, a bottom surface, and an interior surface;
 at least one hinge that attaches to the lid and to one sidewall of the first pair or the second pair of parallel sidewalls;
 at least one lock that allows the body to lock;
 at least one spring-loaded plunger further comprised of a hook that receives an at least one fishing lure;
 at least one bungee cord with an at least two hooks;
 at least one rubber band with an at least two continuous openings;
 at least one movable peg that receives a hook of the at least one fishing lure and/or the at least one spring-loaded plunger, the at least one bungee cord, and/or the at least one rubber band;
 at least one spool that receives a fishing line of the at least one fishing lure;
 at least one LED that is motion activated when the lid opens or closes; and
 a battery that powers the at least one LED.

16. The tackle box device of claim 15, wherein the plurality of fishing lures can be stored within the interior surface and/or a bottom surface of the lid and are attached to the at least one-spring loaded plunger, the at least one bungee cord, or the at least one rubber band.

17. The tackle box device of claim 16, wherein the at least one spool is used for winding a string, a line or a chain of each of the plurality of fishing lures and a hook of each of the plurality of fishing lures can be secured around the at least one peg.

18. The tackle box device of claim 16, wherein the at least two hooks of the at least one bungee cord are S-shaped or J-shaped and receive the at least one fishing lure.

19. The tackle box device of claim 15, wherein to secure a fishing lure within the tackle box device, a user attaches a hook of a fishing lure around the at least one peg, then wrapping a fishing line of the fishing lure around the at least one spool, then attaches a hook of the at least one spring-loaded plunger, the at least one bungee cord, or the at least one rubber band to the fishing lure.

20. The tackle box device of claim 19, wherein the fishing lure is stored in constant tension such that it is immovable.

* * * * *